United States Patent [19]

Komula

[11] 4,428,363
[45] Jan. 31, 1984

[54] ENVIRONMENTAL HEATING SYSTEM

[76] Inventor: Raymond W. Komula, 332 Park St., Jamestown, N.Y. 14701

[21] Appl. No.: 861,701

[22] Filed: Dec. 19, 1977

[51] Int. Cl.³ .............................................. F24J 3/02
[52] U.S. Cl. .................... 126/439; 126/450
[58] Field of Search .............. 126/270, 271, 442, 443, 126/446, 450, 438, 439

[56] References Cited

U.S. PATENT DOCUMENTS

| | | | |
|---|---|---|---|
| Re. 30,961 | 6/1982 | Robbins | 126/439 |
| 3,244,186 | 4/1966 | Thomason | 126/270 |
| 3,282,327 | 11/1966 | Hardy | 126/450 |
| 3,299,881 | 1/1967 | Koch | 126/446 |
| 3,915,147 | 10/1975 | Rineer | 126/271 |
| 3,980,071 | 9/1976 | Barber | 126/271 |
| 3,990,430 | 11/1976 | Robertson | 126/270 |
| 4,038,964 | 8/1977 | Drew | 126/271 |
| 4,073,282 | 2/1978 | Schriefer | 126/271 |
| 4,090,493 | 3/1978 | Kneer | 126/270 |
| 4,185,616 | 1/1980 | Johnson | 126/443 |

FOREIGN PATENT DOCUMENTS 1351722  5/1979  United Kingdom ................. 126/442

*Primary Examiner*—Samuel Scott
*Assistant Examiner*—G. Anderson

[57] ABSTRACT

A heating system for heating a building includes a solar energy collector. The collector is constructed from a plurality of glass panels. A first group of glass panels are mounted in an inverted pyramid with mirror surfaces to reflect solar energy to the base of the pyramid. A second group of transparent panels form an upright pyramid which is joined with the first pyramid at the base. A collector coil containing a circulating liquid is mounted at the junction of the bases of the two pyramids to collect solar energy which passes through the transparent upper pyramid and which is also reflected from the inverted pyramid. Water or other fluid is circulated through the collector coil and stored in an insulated storage tank. Thermostatic control is used to control the circulation of the heating fluid in accordance with the temperature. The heating fluid is pumped from the storage tank to various use devices such as baseboard radiators, water heaters and other devices which require heat.

8 Claims, 4 Drawing Figures

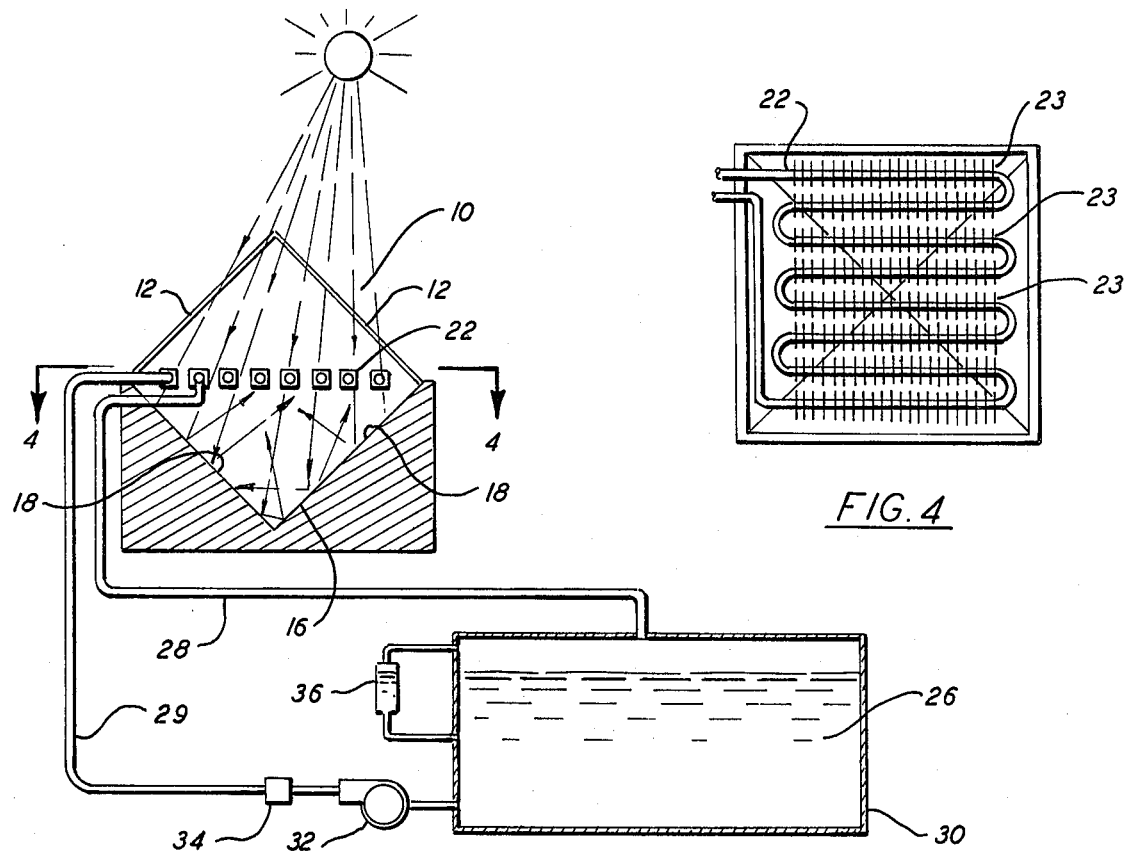
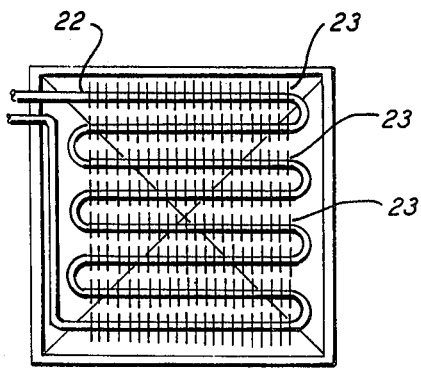
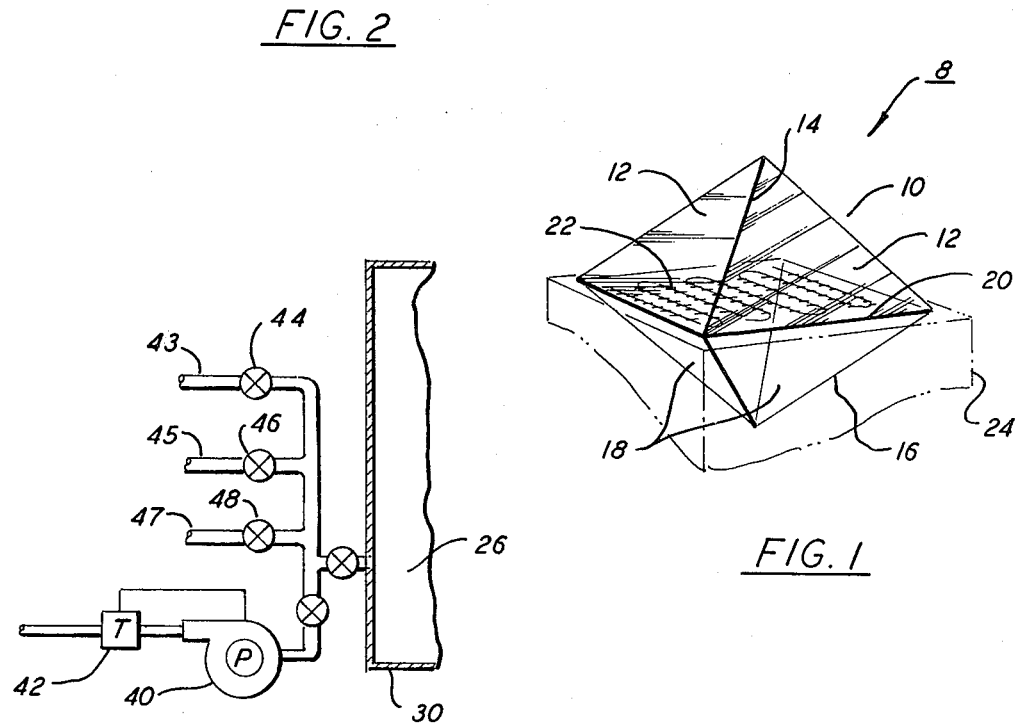
FIG. 4
FIG. 2
FIG. 3
FIG. 1

ENVIRONMENTAL HEATING SYSTEM

BACKGROUND OF THE INVENTION

This invention relates to heating systems and more particularly to heating systems including solar energy collectors.

In prior art, there are many devices and systems of recent vintage which use collectors to collect solar energy for heating of buildings. The prior art solar collectors generally relate to systems employing a black box or black surface which is positioned so as to collect the sun's rays. Nowhere in the prior art is there any solar collector which employs a double pyramid configuration using a collector coil at the common base of the two pyramids where the lower pyramid is internally reflective.

SUMMARY OF THE INVENTION

It is an object of the present invention to efficiently heat a building with a heating system including a solar energy collector wherein the solar energy collector includes a double pyramid configuration with the lower pyramid being formed of a plurality of reflective surfaces with the collector being mounted at the junction of the two pyramids.

It is another object of the present invention to heat a building as above wherein a collector coil mounted at the junction of the two pyramids carries a circulating heating fluid which is stored in a storage tank and which is pumped from the storage tank to one or more systems requiring a heated fluid such as baseboard radiators.

Yet another object of the present invention is to efficiently heat a building with a system as described above wherein the circulation of the heating fluid is controlled by a thermostat to only circulate the heating fluid when the temperature exceeds a predetermined level.

Yet another object of the present invention is to efficiently heat a building with a system as described above wherein the collector coil includes a plurality of radial fins each with a black surface for maximum heat absorbtion from the solar rays.

Accordingly, a solar energy heating system includes a solar energy collection device having a first inverted pyramid constructed of a number of reflecting surfaces, a second pyramid constructed of a number of transparent surfaces, the two pyramids being joined at a common base, a collector coil mounted within the two pyramids at the common base for maximum collection of solar energy, the collector coil having a plurality of blackened fins for maximum energy transfer, a storage tank for storing the heated fluid, thermostatic control for controlling a circulating pump to operate only when the temperature of the heating fluid exceeds a predetermined level and use devices such as baseboard radiators for using the heating fluid to provide heat within a building.

It is an advantage of the present invention that efficiency of the solar collector is improved through the use of a double pyramid configuration with the lower pyramid containing a plurality of reflecting surfaces to maximize the amount of solar energy collected.

BRIEF DESCRIPTIONS OF THE DRAWINGS

FIG. 1 is a perspective view of a solar energy collector according to the present invention.

FIG. 2 is a schematic view of a solar energy heating system according to the present invention.

FIG. 3 is a schematic view of control of the flow of heating fluid from a storage tank to use devices according to the present invention.

FIG. 4 is a top view of a heating coil according to the present invention.

DETAILED DESCRIPTION OF A PREFERRED EMBODIMENT OF THE INVENTION

Referring now to FIG. 1, a solar energy collector according to the present invention will be described.

A transparent pyramid 10 is constructed in the preferred embodiment of a number of equilateral glass triangular shaped sections 12. In this embodiment four identical sections 12 are used. Glass sections 12 are joined together at seams 14 by a suitable bonding material such as epoxy. A similar pyramid 16 is constructed of a like number of mirror surfaces panels 18 where each of the mirror surface panels 18 are of the same size and shape as transparent glass panels 12. The reflective surface on panels 18 is on the inner surface that is the surface facing upward to reflect light ray's passing through the upper pyramid 10 back to the joined base 20 of pyramids 10 and 16. Pyramid 16 is inverted such that the point of the pyramid is down and the base 20 of pyramid 16 is joined to the base 20 of pyramid 10 which has the point of the pyramid in an upward position. Mounted at the bases 20 of pyramids 10 and 16 is a heating coil 22 which is adapted to collect heat from solar energy passing through the upper pyramid 10 directly and also indirectly from reflections from mirror surfaced panels 18 of lower inverted panels 16. The entire solar heat collector structure 8 may be mounted in the ground in an open area or may be mounted in a base 24 which may either be fixed or moveable about one or more axes to allow the pyramid to be aimed to follow the path of the sun during daylight hours. Although not shown, manual or automatic control of movement of collector 8 may be used to enhance the efficiency of the system.

Referring now to FIG. 2, the solar heating system will be described with reference to a schematic diagram. Rays from the sun strike collector coil 22 passing through transparent panes 12 in upper pyramid 10. Some of the sun's rays are reflected from the mirrored surfaces 18 of lower pyramid 16 to collector coil 22 for increased heating and thus increased efficiency of the solar collector system. As the liquid 26 contained in coil 22 is heated it is pumped into storage tank 30 by pump 32 under the control of the thermostat 34. When the temperature of the liquid 26 reaches a predetermined level, thermostat 34 opens allowing pump 32 to be activated causing liquid 26 to be pumped from coil 22 to storage tank 30. When thermostat 34 detects a low limit temperature of liquid 26, pump 32 is turned off thus preventing cooler liquid from lowering the temperature of previously heated liquid 26 in storage tank 30.

As a practical matter, the range of temperatures involved might be in the range of 90 degrees to 210 degrees for turn on of the pump to pump the heated liquid into the storage tank 30 and in the range 90 degrees and below for turning off pump 32 to prevent the cooler liquid from lowering the average temperature of heated liquid previously stored in storage tank 30. On overcast days or at night the temperature of the liquid stored in storage tank 30 will not be degraded by pumping cool liquid into the storage tank. The liquid 26 is transmitted between collector coil 22 and storage tank 30 via conduits 28 and 29. A sight glass 36 is attached to storage tank 30 such that the level of liquid 26 within the storage tank may be visually monitored. In practice, sufficient liquid would be maintained in the system to keep the storage tank approximately 75 percent full to allow for expansion as the liquid is heated.

Referring now to FIG. 3, a schematic diagram of the connection of use systems to the heating systems will be described.

The heated liquid 26 stored in storage tank 30 is pumped out of storage tank 30 when need arises by a second pump 40 under the control of thermostat 42 to baseboard hot water heaters or similar devices for heating an enclosed space such as one or more rooms in a house or building.

Other use devices such as water heaters and the like are fed through valved conduits each being separately controllable by valves 44, 46, 48 in conduits 43, 45, 47. Each of these use systems may also have included a pump and thermostat system for controlling the flow of heating liquid depending upon the temperature of the liquid.

Referring now to FIG. 4, the heating coil 22 will be described in greater detail. Coil 22 is constructed of copper or similar high heat conductivity metal tubing of an nominal diameter such as ⅜ or ½ inch to allow a sufficient flow of liquid to render the heating system practical. A plurality of aluminum serated fins 23 are radially attached to coil 22 along the length of the coil within the heating area of pyramids 10 and 16. Fins 23 are painted black to improve heat absorbtion and thus improve the efficiency of the heat transfer. Coil 22 is connected to conduits 28 and 29 which transmit the heating fluid 26 between the coil 22 and storage tank 30.

Although the invention has been described with respect to a particular structure, thereare many modifications in the structure which are included within the concept of the invention.

Although the present invention has been described in conjunction with a preferred embodiment, it is to be understood that modification and variation may be resorted to without the departing from the spirit and scope of the invention as those skilled in the art will readily understand. Such modifications and variations are considered to be within the scope of the invention as claimed.

What is claimed is:

1. A solar energy collection system, comprising:
 a heat collecting element mounted in a generally horizontal plane between a transparent cover and a reflective base to collect maximum radiated solar energy passing through said transparent and reflected by said reflective base;
 said transparent cover comprising a plurality of flat transparent panels joined at the edges thereof and at the top forming a multi-sided pyramid extending upwardly from said heat collecting element; and wherein said reflective base comprises a plurality of flat mirror-surfaced panels joined together at the edges thereof to form an inverted pyramid to reflect radiant energy to said heat collecting element.

2. Apparatus according to claim 1 wherein said heat collecting element is mounted in a plane generally perpendicular to the plane of incident rays from the sun.

3. A solar energy collection system according to claim 1, wherein said plurality of flat transparent panels is equal in number to said plurality of flat mirror surfaced panels.

4. Apparatus according to claim 1, wherein said transparent cover comprises a plurality of triangular shaped glass panels joined together along edges thereof to form a pyramid structure which is mounted above a similar but inverted pyramid structure forming the reflective base of a like plurality of mirrored surfaced panels and wherein said heat collecting element is mounted at a common base of said transparent pyramid and said reflective pyramid.

5. Apparatus according to claim 1 wherein said heat collecting element comprises a coil constructed of a metal having a high conductivity.

6. Apparatus according to claim 1 wherein said heat collecting element further comprises a plurality of serated fins mounted radially around individual surfaces of said heat collecting element for increasing the total area for heat transfer.

7. A heat collecting element according to claim 6 wherein said fins are blackened to increase heat absorbtion.

8. A solar energy collecting system according to claim 1 further comprising means responsive to temperature for controlling a pump to circulate said heating liquid through said heat collecting element when the temperature of said heating liquid exceeds a predetermined level.

* * * * *